Dec. 14, 1926.

H. P. KRAFT

COMBINED DUST CAP AND VALVE CAP

Original Filed July 14, 1923

1,610,453

INVENTOR:
Henry Phillip Kraft,
By Attorneys,

Patented Dec. 14, 1926.

1,610,453

UNITED STATES PATENT OFFICE.

HENRY PHILLIP KRAFT, OF RIDGEWOOD, NEW JERSEY; EDGAR J. PHILLIPS AND EARL A. DARR EXECUTORS OF SAID HENRY PHILLIP KRAFT, DECEASED.

COMBINED DUST CAP AND VALVE CAP.

Application filed July 14, 1923, Serial No. 651,480. Renewed March 11, 1926.

This invention relates to a combined dust cap and valve cap for pneumatic tire valves and aims to provide certain useful improvements therein. More specifically it constitutes an improvement over my invention disclosed in application Serial No. 637,672, filed May 9, 1923, wherein I have shown and described a combined dust cap and valve cap in which too great a strain on the packing gasket of the valve cap is positively prevented by having the valve cap relatively rotatable within the dust cap, said application showing a split spring ring between said caps for holding the valve cap against rotative and longitudinal action when there is insufficient strain to displace it.

According to the present invention I accomplish the foregoing result more effectively and cheaply through the use of a simpler construction wherein a ball or balls or their equivalent are pressed outwardly into contact with the grooves or flutes of a dust cap making a sort of ratchet which will turn the valve cap to a certain extent when the dust cap is rotated but will permit free turning of the dust cap after the valve cap has been screwed home with sufficient tightness to make a sealing joint. The invention also includes other features of novelty which will be hereinafter more fully set forth.

In the accompanying drawings wherein I have shown the preferred embodiment of my invention, Figure 1 is an elevation of the device, a part being broken away to show the valve cap in cross section.

Figure 1:
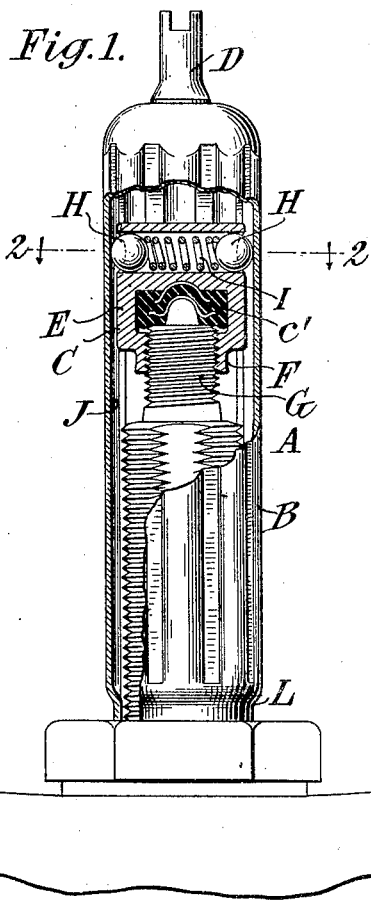
Figure 2:
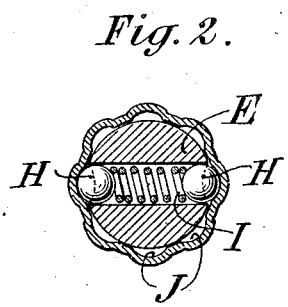
Fig. 2 is a transverse section taken on the line 2—2 of Fig. 1.

Referring first to Figs. 1 and 2 of the drawings let A indicate the combined dust cap and valve cap as a whole which comprises the dust cap member B and the valve cap member C. The dust cap as herein shown consists of a hollow shell open at one end and closed at its other end which latter is preferably formed with a screw-driver projection D for removing the valve insides of a tire valve casing. The valve cap C, as herein shown, consists of a body portion E, which is preferably of circular cross section and adapted for sliding and rotational movement with respect to the dust cap, and a reduced internally threaded skirt portion F adapted for screw threaded engagement with the end of a valve casing G. Within the valve cap is the usual packing gasket and anti-friction member, designated as a whole by the reference character C', said gasket being adapted to provide an air tight seal at the end of the valve casing.

According to the present invention rotational movement is communicated to the valve cap by the dust cap through the medium of means which provides a slip frictional engagement between the dust cap and the valve cap. These means are preferably so constituted as to hold the dust cap and valve cap against relative movement when there is no strain tending to displace them but permitting such relative movement when subjected to a strain sufficient to overcome the frictional engagement provided thereby between the caps. As herein disclosed these means consist of one or a plurality of balls H carried in a recess of the valve cap and pressed outwardly by a spring I into contact with recesses or grooves J on the interior of the dust cap. The recesses or grooves J as herein shown are formed by fluting the dust cap B. The engagement between the ball or balls on the valve cap and the grooves in the dust cap acts as a sort of ratchet which will turn the valve cap when the dust cap is rotated, but after the valve cap has been tightened the dust cap may be turned relatively to the valve cap without moving the latter and without placing an unnecessary strain on the cap packing.

Figure 3:
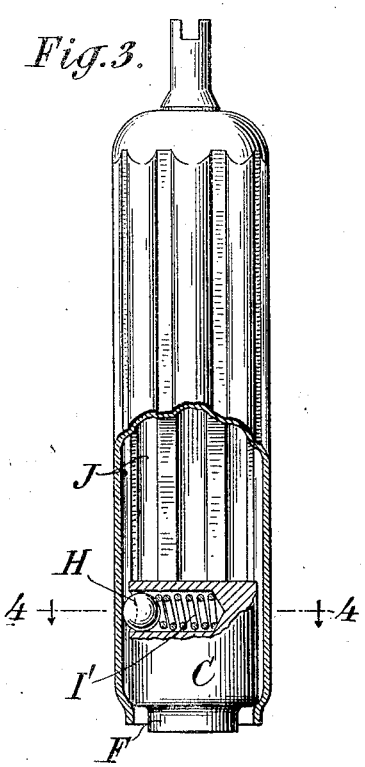
Fig. 3 is a view similar to Fig. 1 showing a modification.
Figure 4:
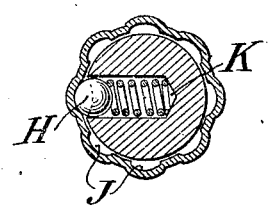
Fig. 4 is a transverse section taken on the line 4—4 of Fig. 2.

In Figs. 1 and 2 the spring I at each end presses against a ball H, but it will be understood that separate springs may be employed to urge each ball outwardly. In Figs. 3 and 4 the construction is substantially identical with that disclosed in Figs. 1 and 2, except that the valve cap C has but a single ball in engagement with the dust cap, said ball being urged outwardly by a spring seated within a depression K in the valve cap. It will be understood, however, that the valve cap may have any number of such spring pressed balls. In order to prevent the total withdrawal of the valve cap from the dust cap and the attendant danger of losing the springs and balls the open end of the dust cap is turned or spun inwardly, as indicated at L, to provide a seat or stop shoulder against which the valve cap will engage when it is sought to withdraw the valve cap from a dust cap.

From the foregoing description it is thought that the operation of the device will be obvious and a detailed description of the operation is therefor not thought to be necessary.

While I have shown and described preferred embodiments of my invention it will be understood that I do not wish to be limited to the specific disclosure since various changes may be made therein without departing from the spirit of the invention. For example, it will be understood that for the balls may be substituted any other member or members which are separate from the springs, such members preferably having the same contour as a ball on their working faces.

I do not herein broadly claim the combination of a dust cap, a valve cap slidable therein and frictional means between said caps normally opposing relative rotation therebetween, but permitting such relative rotation when one of the caps is held stationary, as this forms the subject-matter of an earlier application filed by me on May 9, 1923, Serial No. 637,672.

What I claim is:

1. In combination, a dust cap having internal recesses, a member movable within the dust cap and adapted to engage a valve stem or the like to hold the dust cap thereover, said member having a spring pressed ball adapted to engage in the recesses to provide a slip frictional engagement between the dust cap and the member.

2. In combination, a dust cap having internal recesses, a valve cap movable within the dust cap and provided with a spring pressed ball adapted to engage in the recesses to hold the dust cap and valve cap against relative movement when there is no strain tending to displace them, but permitting such relative movement when subjected to a strain sufficient to overcome the frictional engagement between the caps.

3. In combination, a dust cap having longitudinal grooves, a valve cap movable within the dust cap, said valve cap having a recess, and a spring in said recess pressing a plurality of balls into contact with non-adjacent grooves.

4. In combination, a dust cap having longitudinal grooves, a valve cap movable within the dust cap, said valve cap having a radial recess, spring means in said recess, and a member resiliently held in contact with a groove in the dust cap by said spring means.

5. In combination, a dust cap, a valve cap movable within the dust cap and adapted to engage a valve stem or the like to hold the dust cap thereover, a recess in the valve cap, springs means in said recess and an independent member pressed outwardly into engagement with the dust cap by said spring means.

In witness whereof, I have hereunto signed my name.

HENRY PHILLIP KRAFT.